United States Patent [19]
Kenyon et al.

[11] 3,921,691
[45] Nov. 25, 1975

[54] MACROFILAMENTARY YARNS AND RUBBER STRUCTURES REINFORCED THEREWITH

[75] Inventors: Derek Kenyon; Donald James Wilson, both of Harrogate, England

[73] Assignee: Imperial Chemical Industries, Limited, London, England

[22] Filed: June 13, 1973

[21] Appl. No.: 369,660

Related U.S. Application Data

[62] Division of Ser. No. 863,872, Oct. 6, 1969, Pat. No. 3,889,457.

[30] Foreign Application Priority Data

Oct. 11, 1968 United Kingdom............... 48328/68

[52] U.S. Cl............... 152/359; 152/356; 152/361 R
[51] Int. Cl.² ...................... B60C 9/12; B60C 9/18
[58] Field of Search ........... 152/357, 358, 359, 361, 152/354, 356; 57/140 R, 153

[56] References Cited
UNITED STATES PATENTS

| | | | |
|---|---|---|---|
| 3,160,193 | 12/1964 | Baggett et al...................... | 152/359 |
| 3,243,338 | 3/1966 | Jackson............... | 152/359 |
| 3,253,638 | 5/1966 | Kersker et al....................... | 152/359 |
| 3,395,529 | 8/1968 | Ray...................... | 152/359 |
| 3,419,059 | 12/1968 | Bridge, Jr. ......................... | 152/359 |
| 3,455,100 | 7/1969 | Sidles et al.......................... | 152/359 |
| 3,496,985 | 2/1970 | Werner............................... | 152/359 |
| 3,552,468 | 1/1971 | Gallagher............................ | 152/359 |

Primary Examiner—Drayton E. Hoffman
Attorney, Agent, or Firm—Herbert M. Adrian, Jr.

[57] ABSTRACT

Rubber structures are described which comprise elastomeric material reinforced with synthetic filamentary cord material embedded therein. The cord material comprises a plurality of continuous filaments wherein each of the filaments has a denier of at least 100 and is individually longitudinally twisted prior to plying the individual filaments together into a cord. Such filaments are referred to as macrofilaments and are preferably utilized in rubber structures such as tires.

6 Claims, 6 Drawing Figures

Planar distortion.

Total planar rigidity.

5,000    10,000
Cord denier.

Rigidity per unit weight.

Ply separation.

Distorting force.

MACROFILAMENTARY YARNS AND RUBBER STRUCTURES REINFORCED THEREWITH

This is a division of Ser. No. 863,872, filed Oct. 6, 1969, now U.S. Pat. Letters No. 3,889,457.

The present invention relates to filamentary yarns or cords composed of macrofilaments and to rubber structures reinforced therewith, particularly, though not exclusively, radial-ply pneumatic tires. By "macrofilament" used herein is meant a monofilament having a denier greater than 50.

Textile filamentary cords have previously been described for use in the manufacture of conveyor belts and pneumatic tires in order to reinforce such structures. A typical example of a cord for reinforcing pneumatic tires is one formed from synthetic filaments by twisting a plurality of such filaments to form a yarn and then twisting together a number of these filamentary yarns. The filaments usually have a denier of the order of 5 although filament deniers up to about 20 have been proposed.

According to the present invention, a synthetic filamentary cord comprises a plurality of individually twisted synthetic macrofilaments twisted together, each macrofilament having a denier of at least 100.

The invention also includes rubber structures reinforced with such cords.

The twist properties of the cord may be such that the twist levels in the singles macrofilaments and in the cord are opposite and balanced. For this condition the relationship between the twist levels is given by Singles twist = Cord twist × $\sqrt{N}$ where $N$ is the number of macrofilaments.

The cord may also have a twist level which is equal and opposite to the twist level of the singles macrofilaments. Any twist liveliness in the cord may be reduced or eliminated by subjecting the cord to a heat setting treatment.

The twist level in the cord should be between 2 and 12 turns per inch and is preferably 4 to 8 turns per inch.

The denier of each macrofilament is in the range 100 to 1,500, preferably 400 to 600, and the total denier of the cord is in the range 1,000 to 10,000, preferably 2,000 to 5,000. It is preferable for the individual macrofilaments in the cord to be of the same denier.

Although, for a given cord denier, the number of macrofilaments forming the cord is variable, it is preferred that the number of macrofilaments should be at least three and not more than twenty. A particularly desirable cord in one which is composed of seven macrofilaments.

Therefore, according to a preferred embodiment of the invention, a synthetic filamentary cord comprises seven, individually twisted, synthetic macrofilaments twisted together, each macrofilament having the same denier in the range 400 to 600. This preferred yarn is circular in cross-section due to the excellent packing characteristics of its seven macrofilaments which are arranged such that a sheath of six macrofilaments encompasses a core of one macrofilament.

The microfilaments forming the cords of the present invention may be obtained by melt-extruding synthetic polymers, for example, polyesters, copolyesters, polyamides, and copolyamides. Particularly suitable and preferred synthetic polymers are poly (ethylene terephthalate) and poly (hexamethylene adipamide). It is preferable that each macrofilament should have a tenacity greater than 5 grams per denier.

Rubber structures reinforced with cords of the present invention exhibit a high degree of planar rigidity which makes them suitable for use in the construction of conveyor belts and particularly in the breaker structures of pneumatic tires of the radial-ply type.

Accordingly, the present invention also provides a radial-ply pneumatic tire comprising a carcass consisting of radial plies of textile material and a tread layer, a breaker structure disposed between the carcass and the tread layer, the breaker structure being formed of at least two plies or layers of parallel macrofilament cords embedded in rubber, each cord consisting of a plurality of individually twisted macrofilaments twisted together, each macrofilament having a denier of at least 100.

The invention will be more fully described by reference to the drawings wherein.

In each breaker ply, the macrofilament cords may be disposed at zero inclination or a small angle only, not exceeding 20°, to the midcircumferential plane of the tire; and the cords in one breaker ply may be disposed at zero inclination or a small angle only, not exceeding 40°, to those in the adjacent breaker ply or plies.

Figure 1:
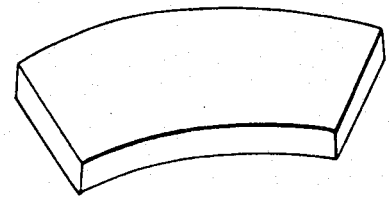
FIGS. 1 through 4 illustrate the relationship between breaker ply separation and planar rigidity per unit weight.

That property of the reinforced structures of the invention, referred to herein as planar rigidity, is a particular importance in the region of the breaker plies of a radial-ply tire. It is determined by the compression and the tensile moduli of the cords embedded in the rubber, although it depends to a greater extent on the smaller of these two modulus values which, in general, is the compression modulus. Considering the breaker plies as being a planar laminate structure, see FIG. 1 of the accompanying drawings, then the planar rigidity of the structure is defined as the resistance to shear and bending of the structure in the plane parallel with the reinforcing plies. When the breaker structure is forming part of a tire then this place corresponds to the plane of the road contact patch of the tire. The compression modulus of the breaker structure is essentially determined by the compression moduli of the macrofilament cords. The compression moduli of the cords of the present invention are greater than for multifilament cords of the prior art, resulting in breaker structures of increased planar rigidity per unit weight of reinforcement material. The compression modulus of the breaker structure of the tire according to the invention should be at least 35,000 pounds per square inch.

The macrofilament cords have to be embedded in and firmly adhered to the rubber of the breaker region of the tire. In order to achieve the latter requirement, it is desirable to use an adhesive which is specially prepared for the purpose of improving adhesion between cords formed of synthetic polymeric materials and rubber. For example, the adhesive "Pexul" (R.T.M.) is used to adhere polyester materials to rubber.

Figure 2:
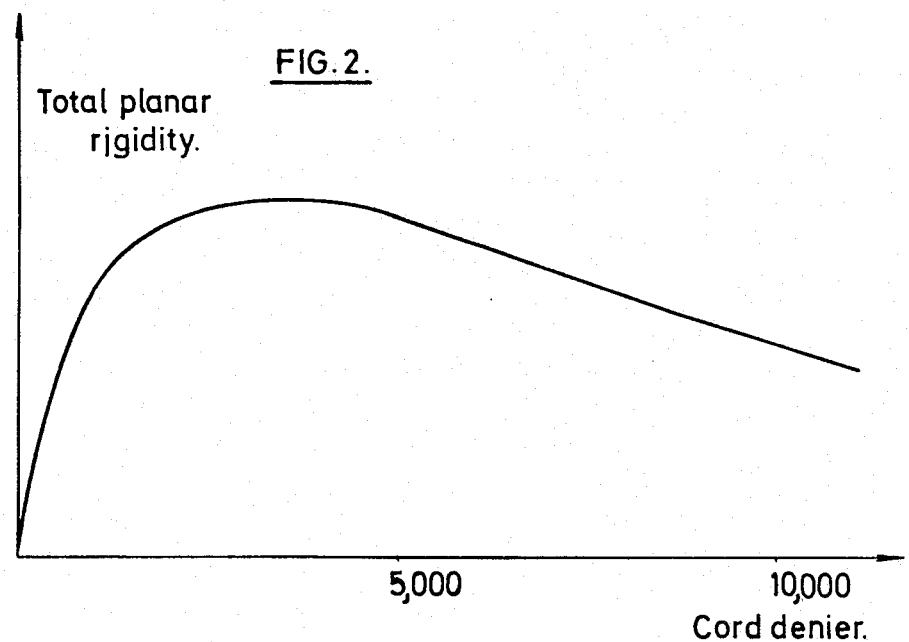
Figure 3:
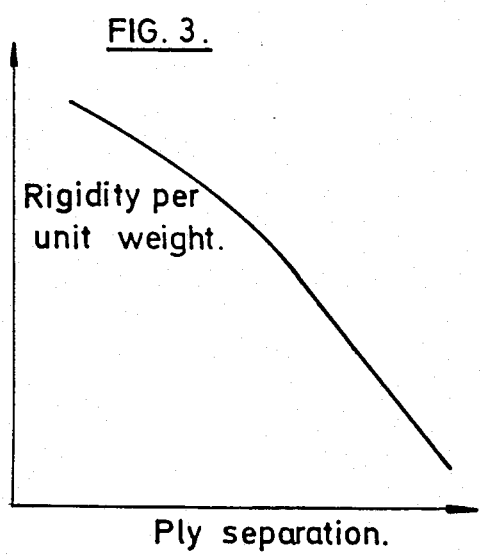

In order to achieve the maximum planar rigidity of the breaker structure it has been determined that the macrofilament cord denier should be in the range 2,000 to 10,000, preferably 3,000 to 5,000. The basis for this range can be clearly seen from FIG. 2 of the accompanying drawings which illustrates the relationship between total planar rigidity and cord denier; furthermore the planar rigidity is increased the closer the breaker plies are positioned with respect to one another, as seen in FIG. 3 of the accompanying drawings which illustrates the relationship between breaker ply separation and planar rigidity per unit weight.

Figure 5:
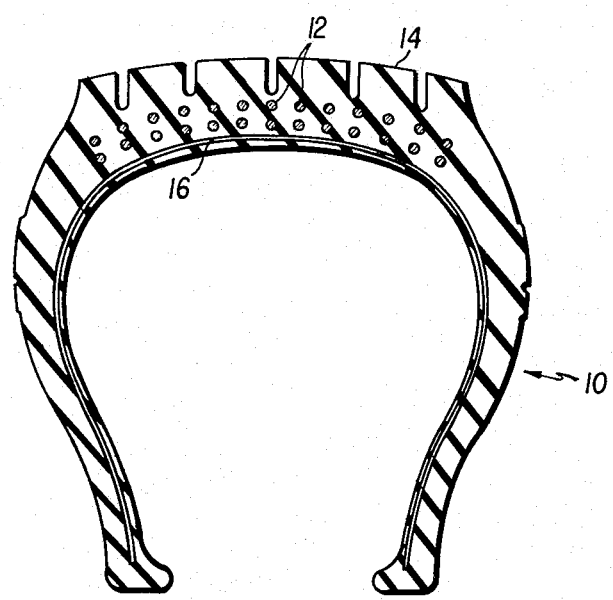
FIG. 5 is a cross-sectional view of a radial tire.
Figure 6:
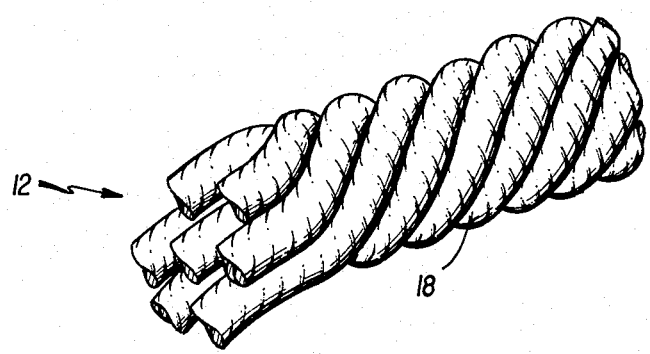
FIG. 6 is an enlarged view of a segment of cord of the present invention comprising individually twisted macrofilaments.

Referring more particularly to FIG. 5, radial ply tire 10 comprises a breaker structure of a plurality of macrofilament cords 12 positioned between the tread layer 14 and carcass reinforcing layer 16. FIG. 6 is a greatly enlarged segment of macrofilament cord 12, which is comprised of a plurality of individual macrofilaments 18 which are twisted together to form the cord.

If desired, the planar rigidity of a reinforced rubber structure according to the invention can be markedly increased by dispersing staple fibers in the rubber interlayer(s) between the two (or more) plies of macrofilament cords. Suitable staple fibers are from 0.125 to 3 inches long and have deniers in the range 1 to 5. The proportion of staple fibers present in a rubber interlayer is preferably between 5 to 25 percent based on the weight of elastomer. The staple fibers are preferably made from polyethylene terephthalate, although polyamide and rayon fibers are suitable.

The invention will be further described by reference to the following Examples.

EXAMPLE I

A sample of a breaker structure for a tire according to the invention and which consisted of two plies of parallel macrofilament cords of polyethylene terephthalate embedded in rubber was made as follows:

Cord Production

Three packages of single end macrofilaments, each macrofilament having a denier of 1000, were downtwisted on a conventional ring and traveler machine. These twisted single macrofilaments were then twisted to form a three-fold cord. Each macrofilament had 5 turns per inch 'S' twist and the cord had 5 turns per inch 'Z' twist.

Cord Preparation

The cord was heat set and adhesive dipped by a single end treatment on a Litzler "Computreater" machine. The adhesive dip solution used was composed of one part of a 10% "Pexul" (R.T.M.) solution to one part of a 15 percent Resorcinol Formaldehyde Latex. The composition of the Latex was Water — 650 parts
Resorcinol — 25 parts
Formalin — 14 parts
"Gen Tac" Latex — 310 parts The heat setting and dip curing conditions were 240°C for 30 seconds at 1 percent stretch applied to the cord.

Construction of Sample Breaker Structure

A cord ply was prepared by wrapping cord at 20 ends per inch onto a rectangular plate, pressing a thin uncured rubber sheet onto the cords, cutting the cords embedded in the rubber sheet from the plate, and pressing a second rubber sheet onto the other side of the cords. A second cord ply was prepared in a similar manner.

The sample breaker structure was built up using sheets of uncured rubber and the breaker plies as made above to form a structure having a length of 15 cm., a width of 5 cm., and a thickness of 0.7 cm. The cord plies were inclined at an angle of 20° to the longitudinal center line of the sample and at an angle of 40° to each other. The separation between the cord plies was 1.0 mm. The sample breaker structure was then cured by heating at 150°C for 30 minutes while being restrained in a mold.

The planar rigidity of the structure was measured and the result is given in Table I.

EXAMPLE II

A comparative sample of a conventional breaker structure which consisted of two plies of multifilament cords of polyethylene terephthalate embedded in rubber was made according to the method described in Example I. Each cord was composed of three yarns which were plied together such that each singles yarn had 7 turns per inch 'S' twist and the resultant cord had 7 turns per inch 'Z' twist. Each yarn was made up of 192 filaments and had a denier of 1,000. The planar rigidity of this structure is given in Table I.

EXAMPLE III

A sample breaker structure was made according to Example I but with the addition of 5% by weight of 3 denier, 0.25 inch staple fibers of polyethylene terephthalate in the rubber interlayer between the plies. The planar rigidity of the structure is given in Table I.

Table I

| Example No. | Planar Rigidity/Unit Weight* |
|---|---|
| I | 0.35 |
| II | 0.21 |
| III | 0.71 |

*The weight is that of all the textile materials used in the reinforcement i.e. cord or cord and staple fibers.

Figure 4:
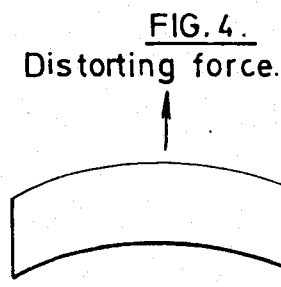

The values of planar rigidity for the tested samples were based on the results derived from subjecting each sample to a simple test performed by an Instron tensile tester ("Instron" is a Registered Trade Mark). The Instron tester is adapted to induce a planar distortion to a sample, as illustrated in FIG. 4 of the accompanying drawings. A graph can be obtained of the distorting force against the amount of distortion as measured by the upward deflection of the center of the sample. For comparing the performance of different reinforcements, the following arbitrary definitions are applied:
  i. Block Planar Rigidity: Excess distorting force required to distort the block 1.5 mm. to 2.5 mm. at an Instron speed of 5 mm./minute.
  ii. Reinforcement Density: The number of cord ends per centimeter per ply multiplied by cord denier (plus the weight/volume of staple fiber when present).
  iii. Planar Rigidity per Unit Weight: Planar Block Rigidity (reinforced sample) minus Planar Block Rigidity (plain rubber sample) divided by the Reinforcement Density.

What is claimed is:
1. A rubber structure comprising elastomeric material reinforced with a synthetic filamentary cord embedded therein, said cord comprising a plurality of continuous filaments, each of said filaments having a de- nier of at least 100 and being individually longitudinally twisted, said individually twisted filaments being further twisted about the other filaments to form a coherent cord of said plurality of filaments.

2. The rubber structure of claim 1 in the form of a radial-ply pneumatic tire comprising a carcass consisting of radial plies of textile reinforcing material and a tread layer, a breaker structure disposed between the carcass and the tread layer, the breaker structure being formed of at least two plies or layers of parallel macrofilament cords embedded in rubber, each cord comprising a plurality of continuous filaments wherein each of said filaments has a denier of at least 100 and is individually longitudinally twisted, said individually twisted filaments being further twisted about the other filaments to form said cord.

3. The tire of claim 2 wherein the cords are formed from poly(ethylene terephthalate).

4. The tire of claim 2 wherein the cords are formed from poly(hexamethylene adipamide).

5. The tire of claim 2 wherein the total denier of each cord is between 2,000 and 5,000.

6. The tire of claim 2 wherein staple fibers are dispersed in the rubber between the plies of cord.

* * * * *